(12) United States Patent
Vasseur et al.

(10) Patent No.: US 9,485,153 B2
(45) Date of Patent: Nov. 1, 2016

(54) DYNAMIC NETWORK-DRIVEN APPLICATION PACKET RESIZING

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Grégory Mermoud, Veyras (CH)

(73) Assignee: Cisco Technology, Inc., San Jose, CA (US)

(*) Notice: Subject to any disclaimer, the term of this patent is extended or adjusted under 35 U.S.C. 154(b) by 165 days.

(21) Appl. No.: 14/164,622

(22) Filed: Jan. 27, 2014

(65) Prior Publication Data

US 2015/0195212 A1 Jul. 9, 2015

Related U.S. Application Data

(60) Provisional application No. 61/923,910, filed on Jan. 6, 2014.

(51) Int. Cl.
| | |
|---|---|
| *H04L 12/24* | (2006.01) |
| *H04L 12/805* | (2013.01) |
| *H04W 24/02* | (2009.01) |
| *H04L 12/751* | (2013.01) |
| *H04L 12/803* | (2013.01) |
| *H04L 12/26* | (2006.01) |
| *H04W 24/04* | (2009.01) |
| *H04L 12/721* | (2013.01) |

(52) U.S. Cl.
CPC .......... *H04L 41/5025* (2013.01); *H04L 45/02* (2013.01); *H04L 47/122* (2013.01); *H04L 47/365* (2013.01); *H04W 24/02* (2013.01); *H04L 43/0852* (2013.01); *H04L 45/70* (2013.01); *H04W 24/04* (2013.01)

(58) Field of Classification Search
None
See application file for complete search history.

(56) References Cited

U.S. PATENT DOCUMENTS

| | | | |
|---|---|---|---|
| 6,577,597 | B1 | 6/2003 | Natarajan et al. |
| 6,694,471 | B1 | 2/2004 | Sharp |
| 6,769,024 | B1 | 7/2004 | Natarajan et al. |
| 6,785,239 | B1 | 8/2004 | Tasker |
| 6,886,040 | B1 | 4/2005 | Fitzgerald |

(Continued)

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

(Continued)

*Primary Examiner* — Min Jung
(74) *Attorney, Agent, or Firm* — Parker Ibrahim & Berg LLC; James M. Behmke; Stephen D. LeBarron

(57) ABSTRACT

In one embodiment, information relating to network metrics in a computer network is collected. A packet delay for a packet to be transmitted along a particular communication path is predicted based on the network metrics. Then, an optimal packet size for optimizing a transmission experience of the packet to be transmitted along the particular communication path is calculated based on the predicted packet delay. Also, a size of the packet to be transmitted along the particular communication path is dynamically adjusted based on the calculated optimal packet size.

21 Claims, 6 Drawing Sheets

(56) References Cited

U.S. PATENT DOCUMENTS

| | | | |
|---|---|---|---|
| 6,961,573 B1 | 11/2005 | Moon et al. | |
| 6,973,034 B1 | 12/2005 | Natarajan et al. | |
| 7,092,410 B2 | 8/2006 | Bordonaro et al. | |
| 7,457,877 B1 | 11/2008 | Shah et al. | |
| 7,568,045 B1 | 7/2009 | Agrawal | |
| 7,606,895 B1 | 10/2009 | Dini et al. | |
| 7,613,128 B2 | 11/2009 | Castagnoli et al. | |
| 7,680,047 B2 | 3/2010 | Vadlakonda et al. | |
| 7,724,676 B2 | 5/2010 | Gerstel et al. | |
| 7,948,910 B2 | 5/2011 | Arbel et al. | |
| 8,005,000 B1 | 8/2011 | Srinivasan | |
| 8,369,213 B2 | 2/2013 | Vasseur et al. | |
| 8,605,591 B2 | 12/2013 | Shaffer et al. | |
| 8,630,177 B2 | 1/2014 | Vasseur et al. | |
| 8,630,291 B2 | 1/2014 | Shaffer et al. | |
| 8,634,314 B2 | 1/2014 | Banka et al. | |
| 8,638,778 B2 | 1/2014 | Lee et al. | |
| 2003/0091052 A1* | 5/2003 | Pate | H04L 1/0007 370/395.1 |
| 2005/0143979 A1* | 6/2005 | Lee | G10L 19/24 704/208 |
| 2007/0071030 A1* | 3/2007 | Lee | H04L 1/0007 370/468 |
| 2008/0181259 A1* | 7/2008 | Andreev | H04L 65/80 370/519 |
| 2009/0019147 A1 | 1/2009 | Ahlers et al. | |
| 2009/0147737 A1* | 6/2009 | Tacconi | H04L 12/5695 370/329 |
| 2010/0046504 A1* | 2/2010 | Hill | H04L 65/607 370/352 |
| 2010/0165863 A1* | 7/2010 | Nakata | H04L 41/0896 370/252 |
| 2011/0085461 A1 | 4/2011 | Liu et al. | |
| 2012/0155475 A1 | 6/2012 | Vasseur et al. | |
| 2012/0233308 A1 | 9/2012 | Van De Houten et al. | |
| 2012/0307653 A1 | 12/2012 | Vasseur et al. | |
| 2013/0022053 A1 | 1/2013 | Vasseur et al. | |
| 2013/0022083 A1 | 1/2013 | Vasseur et al. | |
| 2013/0024560 A1 | 1/2013 | Vasseur et al. | |
| 2013/0028103 A1 | 1/2013 | Hui et al. | |
| 2013/0121331 A1 | 5/2013 | Vasseur et al. | |
| 2013/0159479 A1 | 6/2013 | Vasseur | |
| 2013/0159486 A1 | 6/2013 | Vasseur | |
| 2013/0159550 A1 | 6/2013 | Vasseur | |
| 2013/0201858 A1 | 8/2013 | Varma et al. | |
| 2013/0223229 A1 | 8/2013 | Hui et al. | |
| 2013/0250811 A1 | 9/2013 | Vasseur et al. | |
| 2013/0336126 A1 | 12/2013 | Vasseur et al. | |
| 2013/0336316 A1 | 12/2013 | Sudhaakar et al. | |
| 2014/0003277 A1 | 1/2014 | Shim | |
| 2014/0022928 A1 | 1/2014 | Zingale et al. | |
| 2014/0092753 A1 | 4/2014 | Vasseur et al. | |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

DYNAMIC NETWORK-DRIVEN APPLICATION PACKET RESIZING

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
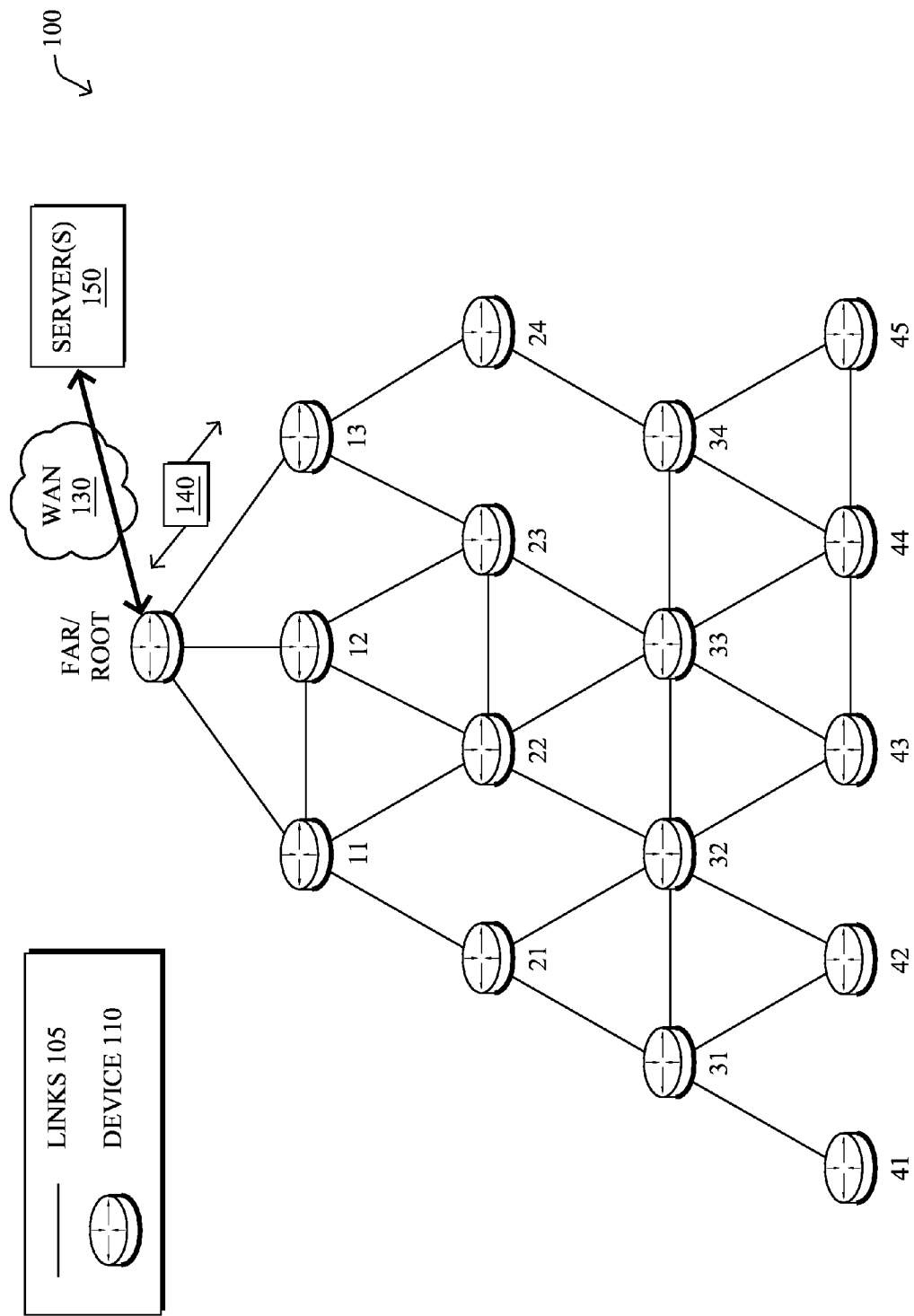
FIG. 1 illustrates an example communication network.

According to one or more embodiments of the disclosure, information relating to network metrics in a computer network is collected. A packet delay for a packet to be transmitted along a particular communication path is predicted based on the network metrics. Then, an optimal packet size for optimizing a transmission experience of the packet to be transmitted along the particular communication path is calculated based on the predicted packet delay. Also, a size of the packet to be transmitted along the particular communication path is dynamically adjusted based on the calculated optimal packet size.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
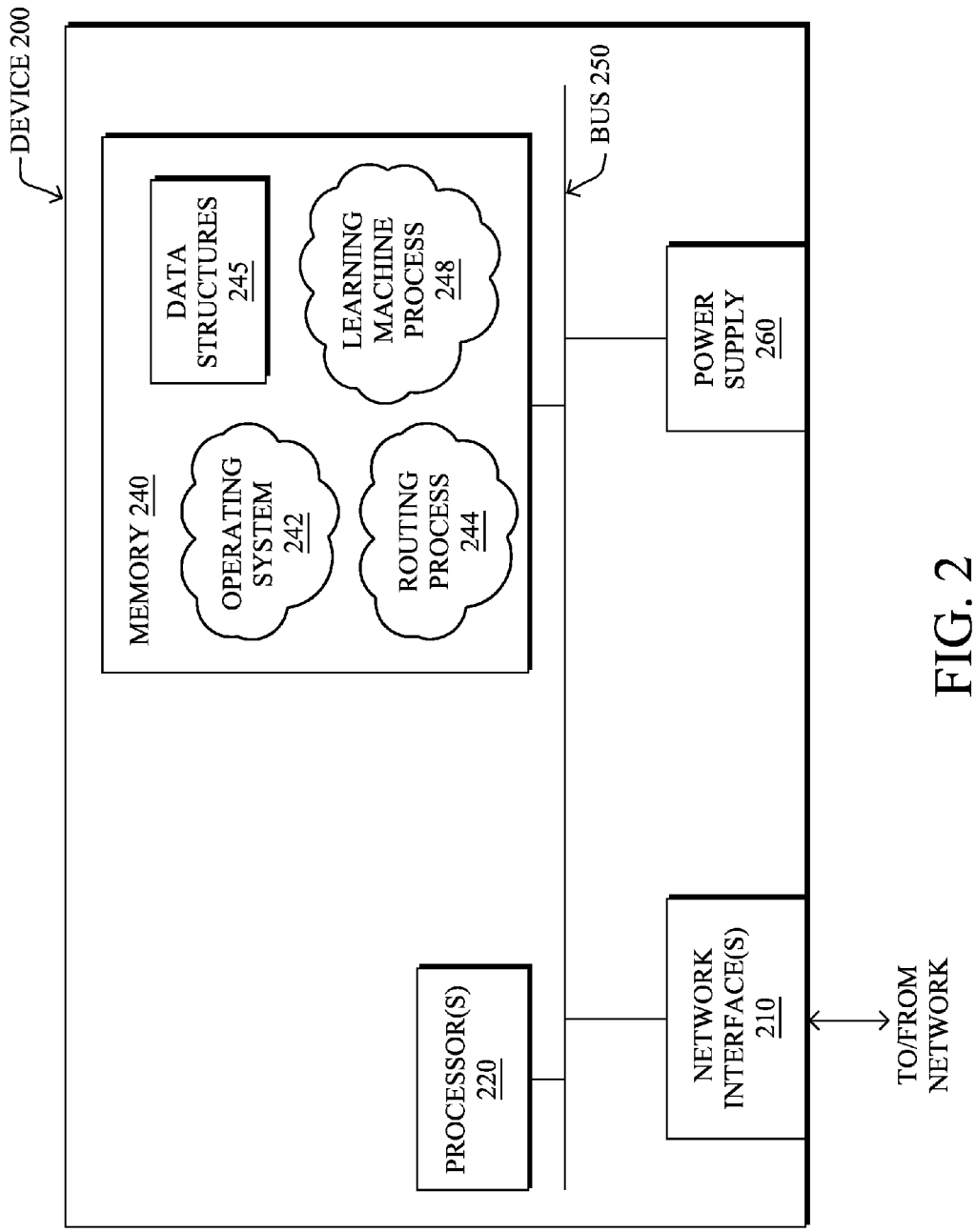
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
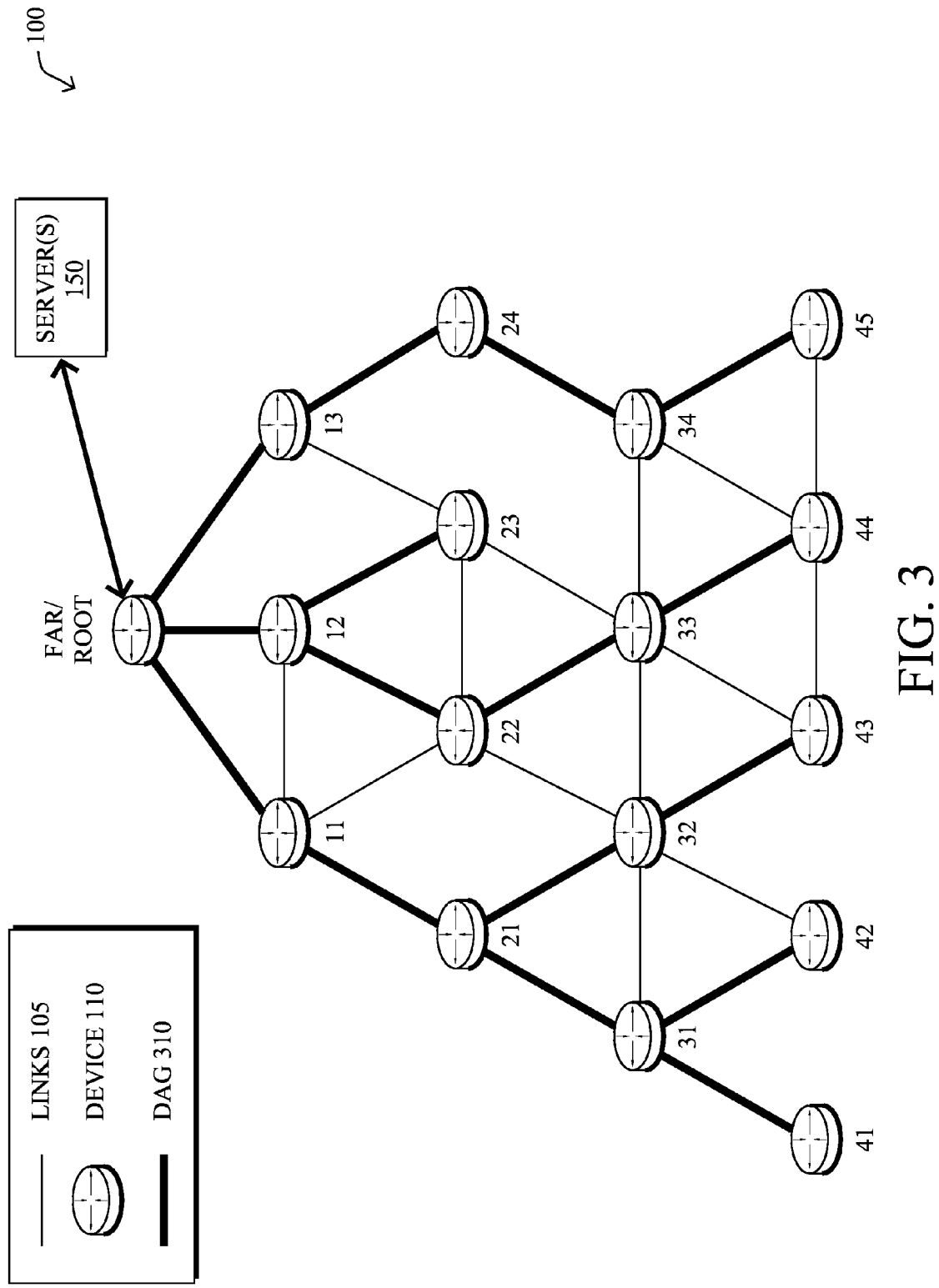
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad (Eq. 1)$$

Figure 4:
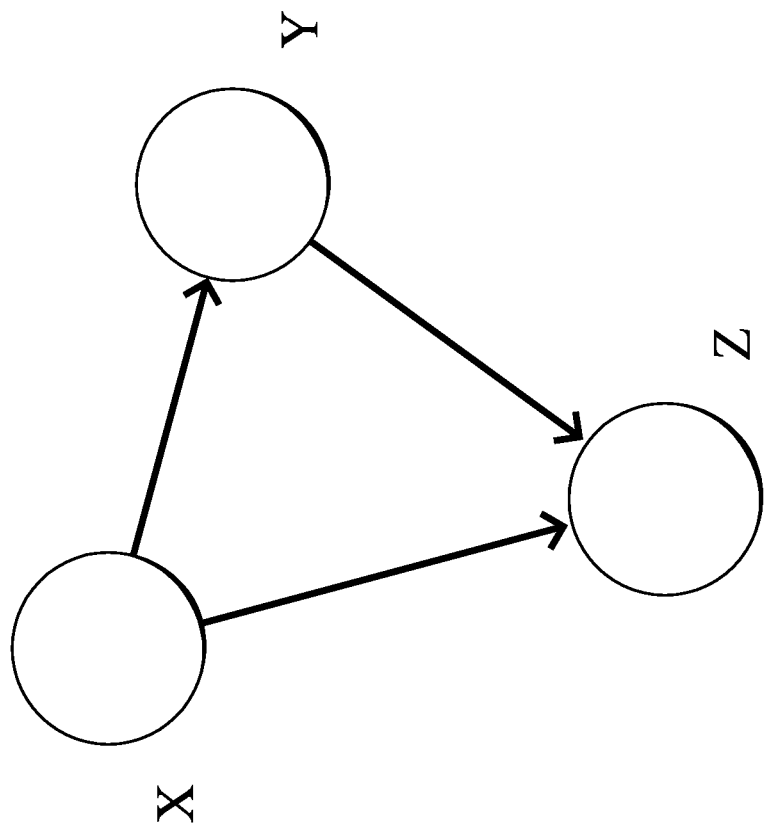
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\epsilon \quad (Eq. 2)$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE=\Sigma_i(b^T x_i-y_i)^2/N \quad (Eq.3)$$

where N is the total number of input data points, i.e., i= 1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
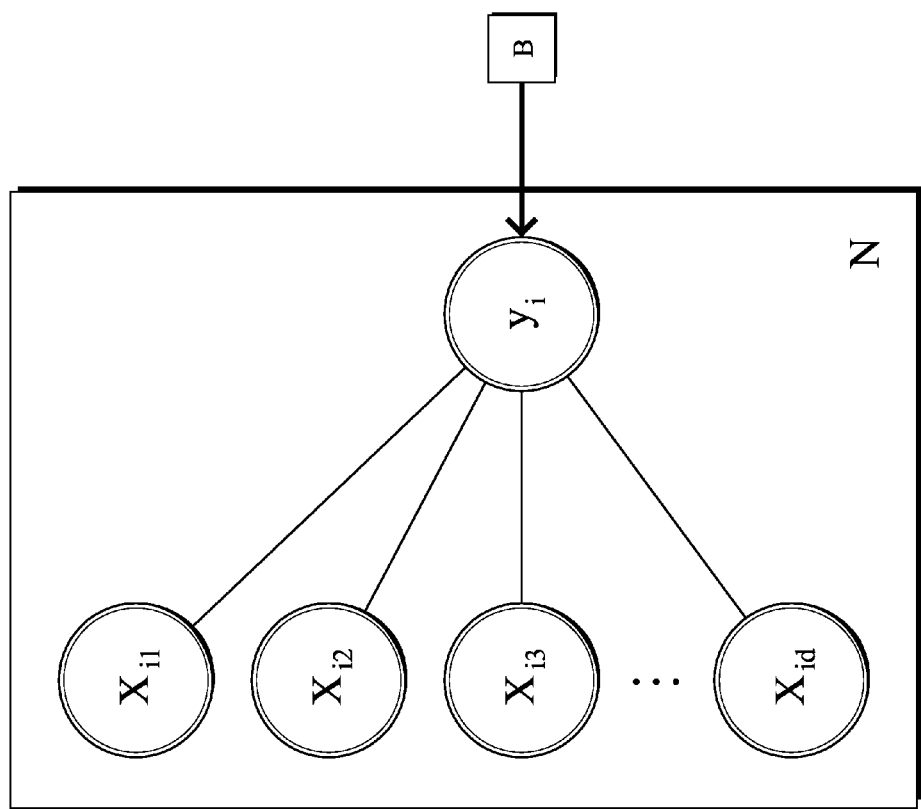
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Dynamic Network-Driven Application Packet Resizing

One of the key factors that govern the delay experienced by a packet in a low power and power networks (and thus the transmission time) is the size of the packet. In contrast with classic IP/MPLS networks where the bit error rate is extremely low (of the order of 10-12) LLNs are prone to high error rate. Consequently the packet size for a packet P with b bit with an error bit of E leads to a probability of successful transmission of the packet equal to (1−E)b, which decreases exponentially with E. Furthermore, collisions may further increase the probability of packet error rate, especially in dense areas. Last but not least, the issue becomes even worse with conservative retransmission layers used by low power link layers that may use exponentially back-off, leading to dramatically increasing the overall end-to-end delay.

Note also that although some LLNs are of limited size (e.g., networks in home automation), others such as Advanced Metering Infrastructure (AMI) may have a mesh with several thousands of nodes. When transmitting a packet along a path of N hops, with links being lossy, the overall delay experienced by the packet is highly driven by the end-to-end packet error rate. It has been observed in the field that N can be at large as 19. Thus the probability of successfully transmits a packet P along a 19-hop path made of lossy links is highly driven by the packet size. Note also that applications in LLNs usually make use of UDP, implying for the packet drop to be handled by the application itself.

The techniques herein present several mechanisms where the relationship between the size of a packet, its destination, and the path it follows can be learned and dynamically adjusted, in contrast with all existing approaches. Based on the learned statistical model, new mechanisms are presented to dynamically change the size of a packet at multiple points in its lifetime to optimize the transmission experience, resulting in optimum transmission times, for example.

Said differently, in contrast with existing approaches where packet size is only adjusted based on MTU, which may lead to very sub-optimal delays in LLNs, the techniques herein presents multiple mechanisms to determine optimum packet sizes for nodes based on SLA requirements of applications. In particular, the techniques herein outline a process where a Learning Machine computes a predictive model that also takes into account the packet size when predicting the delay. To that end, a strategy is specified below that captures the packet size of the user traffic as a feature of importance and/or artificially sends packets of different size in the network to build such a predictive model. Then, the techniques herein share the information of optimum packet sizes in light of the required SLA with the corresponding application in order to dynamically adjust the packet size on a per-destination basis, both for the traffic from nodes outside of the LLNs to node inside of the LLN and any pair of nodes in the LLN taking into account the path computed by the routing topology. The application uses this information to dynamically resize the information it generates for optimum delay experience.

Notably, techniques involved in dynamic adaptation of network parameters are a common practice and have been employed in various capacities for many years in the networking industry. These techniques however mostly range from changing feature knobs on routers to cost metrics that govern topologies and are mostly reliant on human intervention as a reaction to some network event. In addition to this, there is no known way where network conditions have governed the size packets being generated. By contrast, in the techniques herein, mechanisms are presented to dynamically send a feedback to the application generating traffic to tune the size of the packets based on the network conditions around the area and en route to the destination.

Operationally, the techniques herein consist of several components, each responsible for a specific aspect.

Learning Component: This component predicts link-wise QoS, and nodes share statistics about re-transmission counts and collision details for each link it is part of. All the desired characteristics of a link l may be summarized in a vector xl, called a feature vector, which is passed as input to a predictive performance analysis (PPA) engine, which then yields a prediction of the packet delay for a particular link. The PPA engine can be seen as a function y=F(xl), which returns the expected QoS metric (e.g., the delay) for a particular link l characterized by xl. In the context of the techniques herein, the PPA engine is augmented with the packet size as input, such that y=F(xl, size) where size is the packet size. As described above, the techniques herein expect F(., size) to be monotonically and non-linearly increasing with size, but the exact relationship needs to be learned from empirical data. To this end, the PPA engine needs to be trained with data that include information about the packet sizes. This is the role of the Probing Component described hereafter. Note that adding the packet size as a feature for the LM is fundamental.

Size Tracking Component: This component is responsible for keeping track of the distribution of packet sizes that a node sees. There is an active and passive component involved. For the active component, in one embodiment, explicit probes can be sent to different parts of the network. In addition to the act of probing the size of the probes can be made to vary as well. A systematic approach may be used to start sending packets with size P where P is less than the minimum MTU along the path using the Path MTU discovery mechanism in order to avoid fragmentation (another source of packet loss, exacerbated in IPv6 network where packet fragmentation is handled by the source of the packet), and increase progressively P up to the maximum packet size in order to avoid fragmentation, taking into account the header added be router at the fringe of the LLN when packets are source routed.

In the passive component, in an embodiment, the size of the application packet itself will provide more data points as it traverses through the network. In yet another embodiment, randomly time-stamped packets will lead to varying packet sizes in the upstream direction thereby adding more richness to the information base tracking packet sizes. Additionally, these packet size ranges will vary for nodes at different depths in the DAG as packets that need to travel deeper in the DAG suffer from larger delays. Note that, importantly, similar approaches can be used to predict other QoS metrics than delay, such as jitter, loss, bandwidth, etc.

Planning Component. This component is used by the network operator or application designer/developer/operator to share the requirements of a specific application with the network. In this component, SLA requirements of the application are compared with predictions of the Learning Component. The SLA requirements take the form of a list of nodes along with constraints on the QoS metrics (latency, jitter, availability, etc.). Typically, these requirements are soft, that is, they are expressed probabilistically. For instance: the QoS of node N must be within interval [Q1, Q2] with probability P. Based on this information, the Planning Component may now query the Learning Component to find the optimal packet size such that this constraint is fulfilled, and then transmit it to the application. Note that the Learning Component will return an estimated delay along with an interval of confidence, such that it is compatible with so-called soft (or probabilistic) SLA requirements.

In yet another embodiment, the LM triggers the computation of the end-to-end between each pair of nodes in the network in order to estimate the delay as a function of the packet size. In one embodiment such a computation may be performed for every pair of nodes, or in another embodiment, the LM may compute such estimate for "heavy" flows in the network. As a result, the LM may determine that the traffic between a node A and a node B is likely to be out-of-SLA in terms of delay should the packet size exceeds a value V, considering the path followed between A and B by a traffic of class of service C. In such a case, the techniques herein specify a newly defined unicast message MPS( ) (Max Packet Size) that is sent to the node, that may either perform packet fragmentation (in the case of IPv4) or relay the signal back to the source of traffic sending traffic through that node (e.g., a sensor, or computer attached to it).

Once this information is received by the application, the packet size may be dynamically adjusted according to the packet destination in order to meet the required SLA. This will require the application to support fragmented packets being sent and received such that the designated node can recreate the original information.

Resizing Component. This component is responsible for fragmenting packets based on the optimum size provided by the Planning Component. Application traffic can have different sources or destinations inside or outside the DAG. For one that is originating from outside the DAG, destined for one of the nodes in the DAG, the packets may be resized on the fly if the application protocol supports it. For P2P traffic within the DAG, there can be a "local" fragmentation mechanism that can be employed. In this case, the Resizing Component can specifically push optimum packet sizes for relevant pairs of source-destination. Relevant pairs are determined by comparing predicted QoS and SLA requirements, that is, a pair is relevant if and only if it the Learning Component anticipates that SLA is not going to be met for this particular pair of nodes. This information can be then shared with the source node. Once nodes have this information, they can employ a fragmentation mechanism whereby the information from the application is spread across multiple small packets rather than one large packet.

Figure 6:
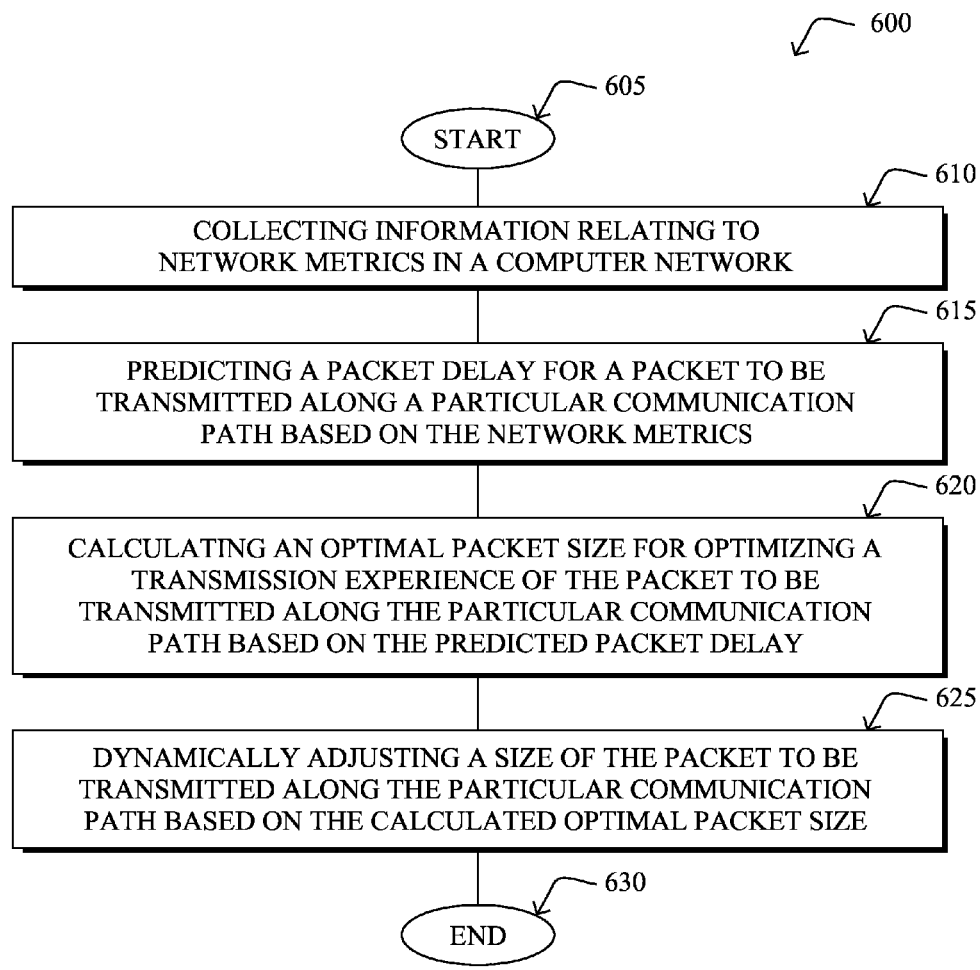
FIG. 6 illustrates an example simplified procedure for a dynamic network-driven application packet resizing.

FIG. 6 illustrates an example simplified procedure for a dynamic network-driven application packet resizing. The procedure 600 may start at step 605, continue to step 610, and so forth.

At step 610, information relating to network metrics in a computer network is collected. It should be understood that the network metrics encompass both metrics that characterize the network, such as QoS, as well as performance metrics derived from how the various elements (e.g., nodes) that make up the network are behaving, such as rate of change in parent-child relationships, their selection skewness, dynamics of packet retransmissions, and so forth.

At step 615, a packet delay for a packet to be transmitted along a particular communication path is predicted based on the network metrics. In particular, an LM may compute a predictive model, which takes into account the packet size, in order to predict the delay. Notably, similar approaches can be used to predict other QoS metrics than delay, such as jitter, loss, bandwidth, and so forth.

Then, at step 620, an optimal packet size for optimizing a transmission experience of the packet to be transmitted along the particular communication path is calculated based on the predicted packet delay. To this point, the disclosed embodiments include mechanisms to determine optimum packet sizes for nodes based on SLA requirements of applications. The SLA requirements of a particular application may include a list of nodes along with constraints on QoS-related metrics, e.g., latency, jitter, availability, and so forth. Also, the requirements may be expressed probabilistically. For instance, the QoS of a given node may be required to be within interval [Q1, Q2] with probability P. Based on this information, the optimal packet size may be calculated, such that this constraint is fulfilled.

Also, at step 625, a size of the packet to be transmitted along the particular communication path is dynamically adjusted based on the calculated optimal packet size. After the optimal packet size is calculated, as explained above, the packet size may be dynamically adjusted according to the packet destination in order to meet the various SLA requirements. Notably, this may require the particular application to support fragmented packets being sent and received such that the designated node can recreate the original information.

The procedure 600 may illustratively end at step 630. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an approach for dynamic network-driven application packet resizing. In particular, the techniques herein allow a learning machine to determine the correlation between packet sizes and QoS experienced by a packet. Also, an application shares its SLA requirements with a Learning Machine to determine the packet size distribution per destination/DAG depth, and correlation information is shared with the concerned application such that it can decide what packet size profile to use when generating/encapsulating information. Moreover, delay is optimized keeping in mind all the retransmissions a packet can experience corresponding to its size.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
collecting, by a learning machine, information relating to network metrics in a computer network;
predicting, by the learning machine, a packet delay for a packet to be transmitted along a particular communication path based on the network metrics, wherein the predicting includes:
building, by the learning machine, a predictive model that takes into account packet size by inputting the collected network metrics into an engine, which then yields a prediction of the packet delay, and
calculating, by the learning machine, an optimal packet size for optimizing a transmission experience of the packet to be transmitted along the particular communication path based on the predicted packet delay; and
sending instructions to an application that will be transmitting the packet that instruct the application to dynamically adjust a size of the packet to be transmitted along the particular communication path based on the calculated optimal packet size determined from the predictive model.

2. The method as in claim 1, further comprising:
sending an instruction to a source node that transmits the packet to adjust the size of the packet based on observed network conditions.

3. The method as in claim 2, wherein the observed network conditions are proximate to one or more of a location of the source node, the particular communication path, and a location of a destination node that receives the packet.

4. The method as in claim 1, further comprising:
observing current network conditions in the network; and
calculating the optimal packet size for optimizing the transmission experience of the packet based further on the observed current network conditions.

5. The method as in claim 1, wherein the optimizing of the transmission experience comprises one or more of: reducing packet delay, improving a transmission success rate, reducing a transmission time, reducing collisions, and reducing packet loss.

6. The method as in claim 1, further comprising:
accessing a service level agreement (SLA) in the network;
determining one or more SLA requirements according to the SLA; and
calculating the optimal packet size for optimizing the transmission experience of the packet based further on the determined SLA requirement.

7. The method as in claim 6, wherein the SLA is associated with one or more of a source node that transmits the packet and a destination node that receives the packet.

8. The method as in claim 1, further comprising:
dynamically adjusting the size of the packet at one or more times during a lifetime of the packet.

9. The method as in claim 1, further comprising:
receiving feedback regarding the dynamically adjusted size of the packet to be transmitted along the particular communication path; and
calculating the optimal packet size based further on the received feedback.

10. The method as in claim 1, further comprising:
sending artificial packets of varying sizes in the computer network in order to construct the predictive model.

11. An apparatus, comprising:
one or more network interfaces that communicate with a computer network;
a processor coupled to the one or more network interfaces and configured to execute a process; and
a memory configured to store program instructions which contain the process executable by the processor, the process comprising:
collecting information relating to network metrics in the computer network;
predicting a packet delay for a packet to be transmitted along a particular communication path based on the network metrics, wherein the predicting includes:
building a predictive model that takes into account packet size by inputting the collected network metrics into an engine, which then yields a prediction of the packet delay, and
calculating an optimal packet size for optimizing a transmission experience of the packet to be transmitted along the particular communication path based on the predicted packet delay; and
sending instructions to an application that will be transmitting the packet that instruct the application to dynamically adjust a size of the packet to be transmitted along the particular communication path based on the calculated optimal packet size,
wherein the apparatus is a learning machine.

12. The apparatus as in claim 11, wherein the process further comprises:
sending an instruction to a source node that transmits the packet to adjust the size of the packet based on observed network conditions.

13. The apparatus as in claim 12, wherein the observed network conditions are proximate to one or more of a location of the source node, the particular communication path, and a location of a destination node that receives the packet.

14. The apparatus as in claim 11, wherein the process further comprises:
observing current network conditions in the network; and
calculating the optimal packet size for optimizing the transmission experience of the packet based further on the observed current network conditions.

15. The apparatus as in claim 11, wherein the optimizing of the transmission experience comprises one or more of: reducing packet delay, improving a transmission success rate, reducing a transmission time, reducing collisions, and reducing packet loss.

16. The apparatus as in claim 11, wherein the process further comprises:
accessing a service level agreement (SLA) in the network;
determining one or more SLA requirements according to the SLA; and
calculating the optimal packet size for optimizing the transmission experience of the packet based further on the determined SLA requirement.

17. The apparatus as in claim 16, wherein the SLA is associated with one or more of a source node that transmits the packet and a destination node that receives the packet.

18. The apparatus as in claim 11, wherein the process further comprises:

dynamically adjusting the size of the packet at one or more times during a lifetime of the packet.

19. The apparatus as in claim 11, wherein the process further comprises:

receiving feedback regarding the dynamically adjusted size of the packet to be transmitted along the particular communication path; and calculating the optimal packet size based further on the received feedback.

20. The apparatus as in claim 11, wherein the process further comprises:

sending artificial packets of varying sizes in the network in order to construct the predictive model.

21. A tangible non-transitory computer readable medium storing program instructions that cause a learning machine to execute a process, the process comprising:

collecting information relating to network metrics in a computer network;

predicting a packet delay for a packet to be transmitted along a particular communication path based on the network metrics, wherein the predicting includes:

building, by the learning machine, a predictive model that takes into account packet size by inputting the collected network metrics into an engine, which then yields a prediction of the packet delay, and calculating an optimal packet size for optimizing a transmission experience of the packet to be transmitted along the particular communication path based on the predicted packet delay; and sending instructions to an application that will be transmitting the packet that instruct the application to dynamically adjust a size of the packet to be transmitted along the particular communication path based on the calculated optimal packet size.

* * * * *